United States Patent [19]

Koden et al.

[11] Patent Number: 5,308,539

[45] Date of Patent: May 3, 1994

[54] FERROELECTRIC LIQUID CRYSTAL COMPOSITION AND LIQUID CRYSTAL DEVICE USING THE SAME

[75] Inventors: Mitsuhiro Koden, Nara; Tomoaki Kuratate, Kote; Tohru Kitamura, Kyoto; Kazuhiko Sakaguchi, Toyonaka; Yutaka Shiomi, Amagasaki, all of Japan

[73] Assignees: Sharp Kabushiki Kaisha; Daiso Co., Ltd., both of Osaka, Japan

[21] Appl. No.: 822,629

[22] Filed: Jan. 17, 1992

[30] Foreign Application Priority Data

Jan. 18, 1991 [JP] Japan .................... 3-19403

[51] Int. Cl.⁵ .................. C09K 19/34; C09K 19/32; C07D 307/93; G02F 1/13
[52] U.S. Cl. ................. 252/299.61; 252/229.62; 252/299.63; 359/103; 549/302; 549/322
[58] Field of Search ........... 252/299.01, 299.62, 252/299.61, 299.63; 359/103, 104; 549/302, 322

[56] References Cited

U.S. PATENT DOCUMENTS

| | | | |
|---|---|---|---|
| 5,026,506 | 6/1991 | Koden et al. | 252/299.61 |
| 5,084,302 | 1/1992 | Inoue et al. | 427/164 |
| 5,151,214 | 9/1992 | Koden et al. | 252/299.61 |

FOREIGN PATENT DOCUMENTS

| | | |
|---|---|---|
| 0388141 | 9/1990 | European Pat. Off. . |
| 0442504 | 8/1991 | European Pat. Off. . |
| 3-52882 | 3/1991 | Japan . |

OTHER PUBLICATIONS

Abstract from Derwent Patent Index, Japanese Patent Publication JP-A-052 882, Mar. 7, 1991.
European Search Report, dated Aug. 4, 1992, in which Ref. BC, BD and CA were cited.
CA 101(13):110704u, 1984.

*Primary Examiner*—Shean Wu
*Attorney, Agent, or Firm*—David G. Conlin; Linda M. Buckley

[57] ABSTRACT

A ferroelectric liquid crystal composition including: at least one optically active compound of the formula (I):

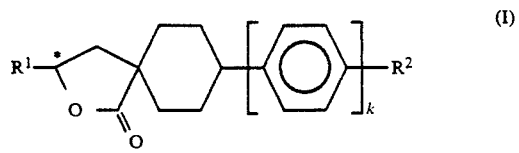

where $R^1$ and $R^2$ are, the same or different, a straight or branched chain alkyl group having 1 to 15 carbon atoms, k represents an integer of 0 or 1, and * represents an asymmetric carbon atom; and at least one compound selected from the group consisting of: compounds of the formula (II):

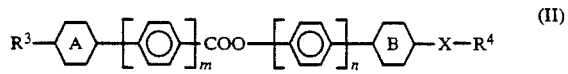

where $R^3$ and $R^4$ are a straight or branched chain alkyl or alkoxy group having 1-15 carbon atoms,

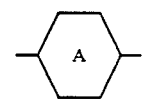

and each represents (Abstract continued on next page.)

(III)

X represents —O—, —CO— or a single bond, m and n are independently an integer of 0 or 1; compounds of the formula (III):

where $R^5$ and $R^6$ are, the same or different, a straight or branched chain alkyl or alkoxy group having 1–15 carbon atoms, and p is an integer of 0 or 1;

said ferroelectric liquid crystal composition exhibiting at least nematic phase, smectic A phase and smectic C phase.

23 Claims, 1 Drawing Sheet

FERROELECTRIC LIQUID CRYSTAL COMPOSITION AND LIQUID CRYSTAL DEVICE USING THE SAME

FIELD OF THE INVENTION

The present invention relates to a ferroelectric liquid crystal composition and liquid crystal device using the same.

RELATED ART

Liquid crystal display device most widely used presently are those utilizing nematic phase. Twisted nematic (TN) liquid crystal devices, however, decrease in contrast with an increase in the number of lines, so that it is practically difficult to fabricate large-capacity liquid crystal devices with 2000×2000 lines or so. To overcome the drawback of TN liquid crystal display devices, supertwisted nematic (STN) liquid crystal display devices and double supertwisted nematic (DSTN) liquid crystal display devices have been developed, whereas these devices still have the drawback of decreasing in contrast and in the response speed with increasing number of lines. Therefore, such devices are limited to a display capacity of about 800×1024 lines.

On the other hand, the prior art has already provided liquid crystal display devices of the active matrix type wherein thin-film transistors (TFT) are arranged on a substrate. Although it is technically possible to give devices of this type a large capacity, for example, of 1000×1000 lines, these devices have the drawbacks of necessitating a long production process and being low in yield and therefore very costly to fabricate.

In recent years, studies have largely made about various display modes utilizing smectic phase as well as liquid crystal display devices utilizing the nematic phase. Particularly, as promising means, ferroelectric liquid crystal display devices are proposed [see N. A. Clark et al., Appl. Phys. Lett., 36, 899 (1980)]. The proposed device ferroelectric liquid crystals having the chiral smectic C phase, chiral smectic I phase and the like. The device can be given a great display capacity with an improved response speed since the memory property of the crystals is utilized. Furthermore, the device can be fabricated at a low cost because it does not need to use active components such as thin-film transistors. The ferroelectric liquid crystal display device also offers a wider field of view. Thus, the device appears very promising as a large-capacity display device having 2000×2000 lines or so.

The liquid crystal materials for use in the ferroelectric liquid crystal display device wherein smectic C phase is utilized must of course exhibit smectic C phase over a wide temperature range around room temperature and need to fulfill various other requirements. First, the device for large-capacity display must have high-speed responsiveness, and from this point of view, the liquid crystal materials need to be highly amenable to spontaneous polarization and low in viscosity. Further to obtain satisfactory orientation and bistability when used for a liquid crystal cell, the liquid crystal material needs to exhibit the phase series of IAC (Isotropic-Smectic A-Smectic C) or INAC (Isotropic-Nematic-Smectic A-Smectic C), and the helical pitch of nematic phase and smectic C phase needs to be sufficiently larger than the cell thickness. It is also desired that the material be great in tilt angle which is relevant to the contrast and brightness of liquid crystal display.

Moreover, it is required to optimize dielectric anisotropy, refractive index and specific resistance. Further still, the liquid crystal material need to have chemical and optical stability.

At present, however, it is impossible for a single compound to fulfill all the desired requirements, so that a plurality of compounds are usually mixed together for use as a liquid crystal composition. To prepare a liquid crystal composition fulfilling the requirements for actual use, it is necessary to use numerous single liquid crystal compounds having a wide variety of properties. It is sometimes likely that compounds which per se exhibit no liquid crystal properties will be useful as components of the liquid crystal composition.

SUMMARY OF THE INVENTION

The present invention that has been accomplished under the above situation aims to provide a liquid crystal composition having a wide operation temperature range, excellent orientation and memory properties, proper tilt angle and refractive index anisotropy as well as good chemical and optical stability, and a liquid crystal display device comprising the same.

Thus, the present invention provides a liquid crystal composition comprising:

at least one optically active compound of the formula (I):

where $R^1$ and $R^2$ are, the same or different, a straight or branched chain alkyl group having 1 to 15 carbon atoms, k represents an integer of 0 or 1, and * represents an asymmetric carbon atom;

at least one compound selected from the group consisting of:

a compound of the formula (II):

where $R^3$ and $R^4$ are a straight or branched chain alkyl or alkoxy group having 1-15 carbon atoms, each represent X represents —O—, —CO— or a single bond, m and n are independently an integer of 0 or 1; and a compound of the formula (III):

(III)

where $R^5$ and $R^6$ are, the same or different, a straight or branched chain alkyl or alkoxy group having 1-15 carbon atoms, and p is an integer of 0 or 1;

said ferroelectric liquid crystal composition exhibiting at least nematic phase, smectic A phase and smectic C phase.

The present invention also provides a liquid crystal display device using the above composition.

DESCRIPTION OF THE PREFERRED EMBODIMENTS

The compounds of the formula (I) are believed to be novel ones which have not been disclosed so far in any documents.

The optically active compounds represented by the formula (I) include the isomers of trans- and cis-forms, both of which can be used for the present invention. The isomers may be mixed together.

In the definition of the formula (I), the straight or branched chain alkyl group having 1 to 15 carbon atoms includes, e.g., methyl, ethyl, propyl, i-propyl, butyl, i-butyl, pentyl, 1- or 2-methylbutyl, hexyl, 1- or 3-methylpentyl, heptyl, 1- or 4-methylhexyl, octyl, 1-methylheptyl, nonyl, 1- or 6-methyloctyl, decyl, 1-methylnonyl, undecyl, 1-methyldecyl, dodecyl, 1-methylundecyl and the like. These alkyl groups may contain an asymmetric carbon atom in the carbon chain. Further, one or more hydrogen atoms in these alkyl groups maybe substituted with a fluorine atom, chlorine atom, bromine atom, cyano group, nitro group, trifluoromethyl group, methoxy group or the like.

The compound (I) of the present invention can be prepared in the following manner:

(I)

where $R^0$ is a hydrogen atom or a straight or branched chain alkyl group having 1 to 14 carbon atoms, $R^2$, k and * have the same meanings as defined in the formula (I).

In the above reaction a cyclohexyl acetic acid derivative (VIa) synthesized in accordance with a known method is reacted with lithium diisopropylamide (LDA) at a mol ratio of 1:2 and at a temperature of $-30°$ C. to $10°$ C., followed by being reacted with an optically active epoxy compound (VIb) at a mol ratio of 1:0.3-3 and at a temperature of $-78°$ C. to room temperature to give an addition compound (VIc). This addition compound is then subjected to intramolecular dehydration in an organic solvent such as benzene, toluene or the like and under the presence of an acid catalyst such as sulfuric acid, hydrochloric acid, paratoluene sulfonic acid or the like, to obtain an optically active $\tau$-lactone derivative of the formula (I).

Of the optically active compounds (VIb) used in the above reaction, a compound (VIb)-(1), for instance, can be prepared in accordance with the following reaction:

(VIb) - (1)

where $R^1$ and * have the same meanings as defined in the formula (I), $R^0$ has the same meaning as defined in the former reaction, and X represents a halogen atom.

In the above reaction the halogenated alkyl or alkenyl ($R^0X$) is reacted with magnesium to synthesize Grignard reagent, which is then reacted with optically active epichlorohydrin to afford the optically active epoxy compound (VIb)-(1).

The above optically active epoxy compound (VIb)-(1) can otherwise be prepared by a reaction of an olefin with air using microorganism.

As the above optically active epichlorohydrin may be used high-purity optically active epichlorohydrin of R- or S-form. The R-form can be prepared in accordance with the methods disclosed by the present inventor in Japanese Unexamined Patent Publication Nos. 132186/1986 and 6697/1987, while the S-form can be prepared in accordance with the method disclosed also by the present inventor in Japanese Unexamined Patent Publication No. 230567/1989.

Not all the compounds (I) do exhibit a liquid crystal phase. However, they can be used in combination with an achiral smectic compound or its composition or with a chiral smectic compound or its composition. The compounds (I) are preferably used in an amount of 0.1-10 wt. % relative to the amount of the intened ferroelectric liquid crystal composition containing the achiral or chiral smectic compound or its composition, more preferably 0.5-5 % relative thereto. If the amount is over 10 wt. %, there arise practical problems such that the compound (I) is crystallized in the ferroelectric liquid crystal composition and the upper limit temperature of the smectic C phase decreases, whereas if the amount is less than 0.1 wt. %, fully improved responsiveness will not be available.

It is essential that the compound (I) be in combination with an A-type compound, which is a liquid crystal compound contributing to a wide temperature range for the smectic C phase, INAC phase series, proper tilt angle and proper refractive index anisotropy. The combination of the compound (I) with the A-type compound is preferably blended with a B-type compound, which is an optically active compound for compensating for the helical pitch induced by the compound (I) in the nematic phase in order to make the composition to have a sufficiently long helical pitch.

The A-type compound necessarily used for combination with the compound (I) includes a compound represented by the formula (II):

where $R^3$ and $R^4$ are a straight or branched chain alkyl or alkoxy group having 1-15 carbon atoms, each represent represents —O—, —CO— or a single bond, m and n are independently an integer of 0 or 1;
and a compound represented by the formula (III):

where $R^5$ and $R^6$ are, the same or different, a straight or branched chain alkyl or alkoxy group having 1-15 carbon atoms, and p is an integer of 0 or 1.

The compounds (II) and (III) are likely to exhibit a stable smectic C phase and at a higher temperature a smectic A or nematic phase. In addition, they are not so high in viscosity, have low melting points, and are hence useful for practical purposes. Further, the compounds (II) and (III) demonstrate proper refractive index anisotropy as about 0.13-0.14, and are chemically and optically stable as well as being free from color development. Therefore, mixing these compounds together at an appropriate ratio and combining the mixture with the compound (I) enables to realize a ferroelectric liquid crystal composition having a wide temperature range for the chiral smectic C phase and a high response speed. The compound (II) is used usually in an amount of 25-99.9 wt. %, preferably 30-99 wt. % relative to the amount of an intended ferroelectric liquid crystal composition, while the compound (III) is used usually in an amount of 30-99.9 wt. %, preferably 35-99 wt. % relative thereto.

The B-type compound preferably blended with the combination of the compound (I) with the A-type compound includes typical optically active compounds for liquid crystal compositions. Among them, especially preferable are a compound represented by the formula (IV):

where $R^7$ and $R^8$ are, the same or different, a straight or branched chain alkyl group having 1-15 carbon atoms, is represents a hydrogen or fluorine atom or a cyano group, Y represents a hydrogen atom or a methyl group, and * represents an asymmetric carbon atom; and a compound represented by the formula (V):

where $R^9$ and $R^{10}$ are, the same or different, a straight or branched chain alkyl or alkoxy group having 1-15 carbon atoms, Y represents a hydrogen atom or a methyl group is and * represents an asymmetric carbon atom.

The compounds (IV) and (V) have potentially a large spontaneous polarization and hence serve not only to compensate for the helical pitch of an intended ferroelectric liquid crystal composition in the nematic phase but also to enhance the spontaneous polarization and response speed thereof when they are used in combination with the compound (I). The two compounds (IV) and (V) are each used in an amount of 0.1–5 wt. % relative to the amount of the ferroelectric liquid crystal composition, preferably 0.5–5 wt. % relative thereto.

It should be noted that the ferroelectric liquid crystal composition may contain appropriate compounds other than the compounds (I), (II), (III), (IV) and (V), in an amount of 1–50 wt. %, preferably 5–30 wt. %.

Thus, it shall be understood that the ferroelectric liquid crystal compositions of the invention comprise typically the combinations of the compound (I), i) with the compound (II), ii) with the compound (III), iii) with the compound (II) and (III), iv) with the compound (II) and (IV), v) with the compoudn (II) and (V), vi) with the compound (III) and (IV), vii) with the compound (III) and (V), viii) with the compound (II), (III) and (IV), ix) with the compound (II), (III) and (V).

Now, the description will be made on a ferroelectric liquid crystal device of the invention.

Figure 1:
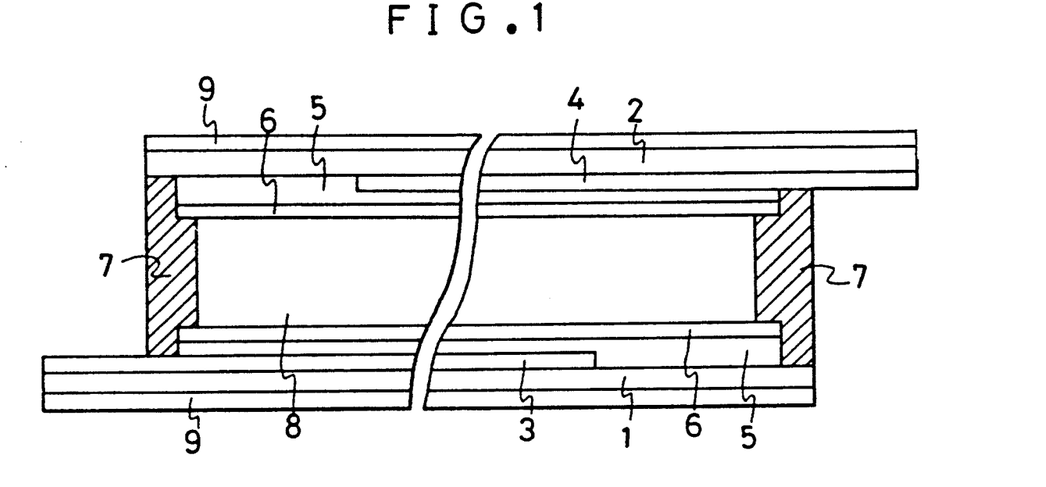
FIG. 1 is a sectional view schematically illustrating a structure of a ferroelectric liquid crystal display device using a ferroelectric liquid crystal composition according to the invention.

FIG. 1 is a sectional view showing a transmissive-type liquid crystal display device using the ferroelectric liquid crystal composition and comprising insulator substrates 1 and 2, transparent electrodes 3 and 4, an insulating film 5, an orientation control layer 6, a sealant 7, a ferroelectric liquid crystal composition 8 and a polarizer 9.

A transparent substrate such as of glass is used as the insulator substrates 1 and 2. On the substrates 1 and 2 are formed respectively the transparent electrodes 3 and 4 of an electric conductive film formed from $InO_3$, $SnO_2$, ITO (Indium-Tin Oxide) or the like, with a desired pattern. The insulating film 5 is usually formed on the electrodes but can be omitted depending on the case. As the insulating film 5 may be used an inorganic-type thin film such as of, for example, $SiO_2$, $SiN_x$ and $Al_2O_3$, or an organic-type thin film such as of, for example, polyimide, photoresist resin and polymer liquid crystals. The inorganic-type thin film can be formed by means of vapor deposition, sputtering, CVD (chemical vapor deposition), solution coating or the like. On the other hand, the organic-type thin film can be formed by coating a solution of the organic material or its precursor in accordance with spin coating, dip coating, screen printing, roll coating or a like technique, and curing it under predetermined curing conditions (heating, photo-radiation or the like). Vapor deposition, sputtering, CVD as well as LB (Langumuir Blodgett) can be applicable thereto.

The orientation control layer 6 is formed on the insulating film 5. In the case of omitting the insulating film 5, the orientation control layer 6 is directly formed on the electrodes 3 and 4. The orientation control layer 6 may be of inorganic type or organic type. For forming the inorganic-type orientation control layer, frequently used is oblique evaporation of silicon oxide, and also applicable is rotary evaporation thereof. These technique allows the resulting films not to be rubbed. In addition, the inorganic-type orientation control layer can be formed from a $SiO_2$ or $SiN_x$ layer in accordance with vapor deposition, sputtering, CVD or the like, with rubbing. On the other hand, the organic-type orientation control layer may be formed from nylon, polyvinylalcohol, polyimide or the like and is usually rubbed to control orientation. Otherwise, it can be made of a polymer liquid crystals film or LB film, without rubbing. Further, orientation can be controlled using magnetic field, spacer edge technique or the like.

Finally, the two insulator substrates are arranged opposite to each other and the liquid crystal composition is injected into a space between the substrates, thereby completing the ferroelectric liquid crystal device of the invention.

Figure 2:
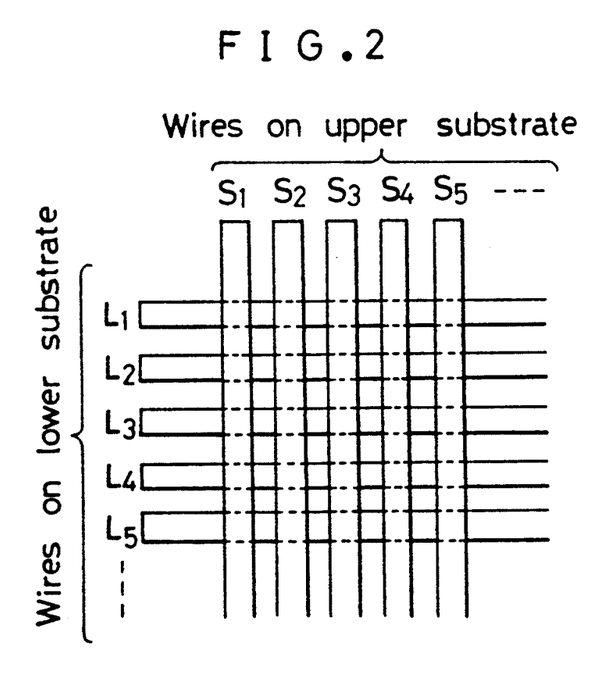
FIG. 2 is a schematic diagram explaining a method of constituting a large-capacity liquid crystal display with a ferroelectric liquid crystal device of the invention.

Although description has been made with reference to a switching device having one pixel as shown in FIG. 1, the ferroelectric liquid crystal composition and liquid crystal device of the invention can be applied to large-capacity matrix displays. In this case electrodes on the upper and lower substrates are combined in a matrix pattern as shown in FIG. 2. Such matrix liquid crystal displays can be driven in accordance with driving methods having heretofore been proposed, for example, Japanese Unexamined Patent Publication No. 59389/1989.

EXAMPLES

The present invention will be described in greater detail with reference to the following examples, which are not intended to be limitative of the invention.

Preparation 1

A solution (3 ml) of 15% n-butyllithium in hexane was added dropwise to a solution of diisopropylamine (505 mg) in tetrahydrofuran (10 ml) cooled at −78° C. The mixture was gradually warmed to 0° C. and stirred for 30 minutes. To the reaction mixture was added dropwise a solution of trans-4-(p-n-octylphenyl)cyclohexancarboxylic acid (695 mg) in tetrahydrofuran (3 ml), followed by being stirred for one hour. The reaction mixture was cooled to −78° C., to which was added dropwise a solution of commercially available (R)-1,2-epoxyheptane [274 mg, optical rotation (D, 25) = +15.0° (neat)] in tetrahydrofuran (2 ml). The reaction mixture was gradually warmed to room temperature, stirred for six hours and then added with water, followed by being acidified with hydrochloric acid and extracted with chloroform. The extract was added with dry benzene and a catalytic amount of sulfuric acid, and heated and stirred for six hours while effusing benzene by portions. The extract was then cooled and distilled under reduced pressure to remove benzene. The residue was purified with silica gel column chromatography to give r-lactone derivative in cis form (443 mg) and in trans form of the following formulae:

CiS Form $[\alpha]_D^{21} + 13.08°$ (c = 1.063, $CH_2Cl_2$)

transition temperature

$$C \xrightarrow{67° C.} I$$

$^1$H-NMR(CDCl$_3$)

-continued
δ: 0.8~0.9 (6H, m)
1.2~2.0 (38H, m)
2.12 (1H, dd)
4.40 (1H, m)

$^{13}$C-NMR(CDCl$_3$)
δ: 14.11, 22.70, 25.36, 26.86, 27.57,
29.37, 29.42, 29.52, 29.56, 29.64,
31.95, 32.15, 32.22, 33.09, 35.06,
35.71, 35.99, 43.33, 43.53, 76.95,
180.43 trans From $[\alpha]_D^{21}$ + 25.38° (c = 1.120, CH$_2$Cl$_2$)
transition temperature $$C \xrightarrow{78° C.} I$$

IR (KBr) 1756 cm$^{-1}$
$^1$H-NMR(CDCl$_3$)
δ: 0.8~1.0 (6H, m)
1.2~2.1 (29H, m)
2.4~2.6 (4H, m)
4.42 (1H, m)
7.11 (4H, s)

$^{13}$C-NMR(CDCl$_3$)
δ: 13.96, 14.10, 22.53, 22.66, 25.05,
29.26, 29.42, 29.49, 29.91, 30.00,
31.53, 31.57, 31.66, 31.89, 34.75,
35.56, 36.03, 38.76, 42.75, 44.83,
77.62, 126.49, 128.43, 140.89, 143.55,
181.85

Preparation 2

A solution (3 ml) of 15% n-butyllithium in hexane was added dropwise to a solution of diisopropylamine (505 mg) in tetrahydrofuran (10 ml) cooled at −78° C. The mixture was gradually warmed to 0° C. and stirred for 30 minutes. To the reaction mixture was added dropwise a solution of trans-4-(p-n-octylphenyl)cyclohexancarboxylic acid (695 mg) in tetrahydrofuran (5 ml), followed by being stirred for one hour. The reaction mixture was cooled to −78° C., to which was added dropwise a solution of commercially available (R)-1,2-epoxytridecane [446 mg, optical rotation (D, 25)= +9.8° (neat)] in tetrahydrofuran (1 ml). The reaction mixture was gradually warmed to room temperature, stirred for six hours and then added with water, followed by being acidified with hydrochloric acid and extracted with chloroform. The extract was added with dry benzene and a catalytic amount of sulfuric acid, and heated and stirred for six hours while effusing benzene by portions. The extract was then cooled and distilled under reduced pressure to remove benzene. The residue was purified with silica gel column chromatography to give τ-lactone derivative (583 mg) of the following formula:

CiS Form $[\alpha]_D^{20}$ +9.28° (c = 1.007, CH$_2$Cl$_2$)
transition temperature $$C \xrightarrow{82° C.} I$$

IR(KBr) 1760 cm$^{-1}$
$^1$H-NMR(CDCl$_3$)
δ: 0.8~1.0 (6H, m)
1.2~1.8 (25H, m)
1.8~2.2 (4H, m)
2.4~2.6 (4H, m)
4.44 (1H, m)
7.10 (2H, d)
7.17 (2H, d)

$^{13}$C-NMR(CDCl$_3$)
δ: 13.96, 14.10, 22.52, 22.68, 24.98,
29.17, 29.27, 29.45, 29.49, 31.54,
31.58, 31.91, 34.29, 34.68, 35.59,
35.90, 42.21, 43.19, 44.86, 76.83,
126.85, 128.31, 140.61, 143.90, 179.77

Example 1

An achiral smectic C liquid crystal composition No. 201 to be shown in Table 1 was prepared. This composition demonstrated smectic C phase at room temperature and phase transition temperature as shown in Table 1.

Optically active compounds Nos. 101-103 to be shown in Table 2 were each admixed in an amount of 2 wt. % relative to the amount of an intended ferroelectric liquid crystal composition with the liquid crystal composition No. 201 to prepare ferroelectric liquid crystal compositions Nos. 301-303 to be shown in Table 3.

All the ferroelectric liquid crystal compositions thus prepared demonstrated chiral smectic C phase at room temperature and INAC phase series.

On each of two glass substrates were formed in sequence an ITO film and a polyimide film (LX-1400: Product of Hitachi Chemical Co., Ltd.), the polyimide film being then rubbed. Subsequently the substrates were bonded together as opposed to each other so as to align the rubbing directions with each other and to have a cell thickness of 2 μm, and the ferroelectric liquid crystal compositions Nos. 301-303 were each injected into the cell. After injection, each of the compositions was heated to a temperature at which it transformed into an isotropic liquid and then cooled to room temperature at a rate of 5° C./min, thus completing a ferroelectric liquid crystal device having good orientation properties.

The ferroelectric liquid crystal device was placed between two polarizers crossing perpendicular to each other and measured with respect to its properties: response speed, tilt angle, memory angle, and orientation of spontaneous polarization. Also measured were transition temperatures with a polarizing microscope and spontaneous polarization values by triangular pulse method [for example, K. Miyasato et al., Jpn. J. Appl. Phys., 22, L661, (1983)]. The results of the measurements are shown in Table 3. The response speed was represented by the period of time in which the rate of transmitted light in quantity varied from 0% to 50 % when rectangular pulse voltage (V=±5 V/μm) was applied to the device at 25° C. The orientation of spontaneous polarization was determined by viewing the movement of molecules when applied with rectangular pulse voltage (±10 V).

Example 2

An achiral smectic C liquid crystal composition No. 202 was prepared. The contents and phase transition temperature of the composition are shown in Table 4. This composition demonstrated smectic C phase at room temperature.

The optically active compounds Nos. 101–102 shown in Table 2 were each admixed in an amount of 2 wt. % relative to the amount of an intended ferroelectric liquid crystal composition with the liquid crystal composition No. 202 to prepare ferroelectric liquid crystal compositions Nos. 311–312 to be shown in Table 5.

All the ferroelectric liquid crystal compositions thus prepared demonstrated chiral smectic C phase at room temperature and INAC phase series.

On each of two glass substrates was formed a polyimide film (LX-1400: Product of Hitachi Chemical Co., Ltd.), the polyimide film being then rubbed. Subsequently the substrates were bonded together as opposed to each other so as to align the rubbing directions with each other and to have a cell thickness of 5 μm, and the ferroelectric liquid crystal compositions No. 311–312 were each injected into the cell. After injection, each of the compositions was heated to a temperature at which it transformed into an isotropic liquid and then cooled to room temperature at a rate of 5° C./min, thus completing a ferroelectric liquid crystal device having good orientation properties.

The ferroelectric liquid crystal device was placed between two polarizers crossing perpendicular to each other and measured with respect to the orientation and values of spontaneous polarization and transition temperatures in the same manner as in Example 1. The results of the measurements are shown in Table 5.

Example 3

An achiral nematic liquid crystal composition No. 203 was prepared. The contents and phase transition temperature of the composition are shown in Table 6. This composition demonstrated smectic C phase at room temperature.

Optically active compounds Nos. 401 and 402 to be shown in Table 7 were each admixed in an amount of 10–40 % relative to the amount of an intended composition with the nematic liquid crystal composition No. 203 to prepare nematic liquid crystal compositions Nos. 410 and 411.

It has already been reported that the helical sense of the compound No. 401 in the nematic phase assumes R(+) while that of the compound 402 assumes L(−) in the same phase.

Then, the compositions Nos. 410 and 411 were respectively brought into contact with nematic liquid crystal compositions admixed respectively with the compounds Nos. 101–103 shown in Table 2 and with the compounds Nos. 501–504 to be shown in Table 8 on prepared slides.

Observation of the slides with a polarizing microscope revealed that schlieren structure, which was observed only when the helical pitch was extended very long, appeared where one of the compositions Nos. 410 and 411 was brought into contact. That is, the schlieren structure did not appear in both the cases where the composition No. 410 was used and where the composition No. 411 was used. The compounds in which the schlieren structure was observed when brought into contact with the composition No. 410 were concluded to induce a helix with L(−) sense in the nematic phase, while the compounds in which the schlieren structure was observed when brought into contact with the composition No. 411 were concluded to induce a helix with R(+) sense in the nematic phase. The direction of helical sense induced by each of the compounds Nos. 101–103 and 501–504 in the nematic phase is to be shown in Table 9.

Example 4

The compound No. 101 in Table 2 and the compounds Nos. 501–504 in Table 8 were each admixed in an amount of 1 wt. % relative to the amount of an intended composition with the nematic liquid crystal composition No. 203 shown in Table 6 to prepare chiral liquid crystal compositions. Helical pitch values of these compositions were measured using a wedge cell. Reciprocals of the values [1/P (%)] are shown in Table 9.

Example 5

The optically active compounds in Tables 1 and 8 and the compounds to be shown in Table 10 were used to prepare ferroelectric liquid crystal compositions Nos. 701–704.

It is known that the helical pitch in the nematic phase is determined by the following equation of linear additive property [refer to J. E. Adams and W. E. L. Hass, Mol. Cryst. Liq. Cryst., 16, 33 (1972)].

$$1/P = E(Ci/Pi)$$

where $\Sigma Ci = 1$, P is a pitch of a liquid crystal composition and Ci is a concentration by weight of each component having an inherent pitch.

The chiral compounds were mixed so as to have liquid crystal compositions having sufficiently long pitches, using the above equation. Reciprocals of pitch values in nematic phase of the ferroelectric liquid crystal compositions thus prepared are shown in Table 12.

As seen from Table 12, all the compositions exhibited sufficiently long pitches.

Example 6

On each of two glass substrates were formed in sequence an ITO film and a polyimide film (LX-1400: Product of Hitachi Chemical Co., Ltd.), the polyimide film being then rubbed. Subsequently the substrates were bonded together as opposed to each other so as to align the rubbing directions with each other and to have a cell thickness of 1.5–1.7 μm, and the ferroelectric liquid crystal compositions No. 701–704 were each injected into the cell. After injection, each of the compositions was heated to a temperature at which it transformed into an isotropic liquid and then cooled to room temperature at a rate of 5° C./min, thus completing a ferroelectric liquid crystal device having good orientation properties.

The ferroelectric liquid crystal device was placed between two polarizers crossing perpendicular to each other and measured with respect to its properties: response speed, tilt angle, memory angle, memory pulse width, transition temperature, orientation and value of spontaneous polarization, and contrast. The results of the measurements are shown in Table 12. The response speed was represented by periods of time in which the rate of transmitted light in quantity varied from 0% to 50%, 0% to 90%, and 10% to 90%, respectively when rectangular pulse voltage (V= ±5 V/μm) was applied to the device at 25° C. The memory pulse width was defined as a minimum pulse width enabling switching when pulse waveform voltage of waveform a or waveform b was applied to the device at 25° C. The contrast was found on the basis of the quantity of transmitted light five seconds after the application of waveform-b voltage.

In the present invention, the compound (I) serves to enhance the spontaneous polarization and response speed of a ferroelectric liquid crystal composition containing the same; the compounds (II) and (III) make it possible to widen the temperature range of the ferroelectric liquid crystal composition, to lower the viscosity thereof and to give the INAC phase series thereto; and the compounds (IV) and (V) compensates for the helical pitch in nematic phase of the ferroelectric composition thereby contributing to realize a sufficiently long helical pitch longer than the cell thickness while enhancing the spontaneous polarization and response speed of the composition.

TABLE 1

Liquid Crystal Composition No. 201

Sc $\xrightarrow{51° C.}$ S$_A$ $\xrightarrow{63° C.}$ N $\xrightarrow{69° C.}$ I

5%

10%

15%

TABLE 1-continued

20%

30%

20%

TABLE 2

| No. | Structure | | m.p (°C.) |
|---|---|---|---|
| No. 101 | [C₅H₁₁—*—CH₂—cyclohexyl(—C(=O)O—)—phenyl—C₈H₁₇] | R cis | 82 |
| No. 102 | [C₅H₁₁—*—CH₂—cyclohexyl(—C(=O)O—)—phenyl—C₈H₁₇] | R trans | 78 |
| No. 103 | [C₁₁H₂₃—*—CH₂—cyclohexyl(—C(=O)O—)—C₅H₁₁] | R cis | 67 |

TABLE 3

| | Ferroelectric Liquid Crystal Composition | | | | | | |
|---|---|---|---|---|---|---|---|
| Composition No. | Transition Temperature (°C.) | | | | Spontaneous Polarization | Response Speed (μsec) | Tilt Angle (deg) |
| | Sc | S$_A$ | N | I | | | |
| No. 301 (containing No. 101) | . 49 | . 61 | . 68 | . | — | 302 | 14 |
| No. 302 (containing No. 102) | . 44 | . 60 | . 67 | . | + | 193 | 15 |
| No. 303 (containing No. 103) | . 50 | . 61 | . 68 | . | — | 769 | 13 |

TABLE 4

Sc $\xrightarrow{56\%}$ S$_A$ $\xrightarrow{64\%}$ N $\xrightarrow{68\%}$ I

1

TABLE 4-continued

| Structure | |
|---|---|
|  | 1 |
|  | 1 |

TABLE 5

Ferroelectric Liquid Crystal Composition

| Composition No. | Transition Temperature (°C.) | | | | Spontaneous Polarization Value (nC/cm²) |
|---|---|---|---|---|---|
| | Sc | S_A | N | I | |
| No. 311 (containing No. 101) | . 53 | . 64 | . 67 | . | −1.9 |
| No. 312 (containing No. 102) | . 38 | . 59 | . 63 | . | +3.3 |

TABLE 6

$$N \xrightarrow{60°\ C.} I$$

| Structure | |
|---|---|
|  | 35% |
|  | 20% |
|  | 30% |
|  | 15% |

TABLE 7

| Compound No. | Structure | Helical Sence in Nematic Phase | Obtained Composition |
|---|---|---|---|
| No. 401 (R) |  | R(+) | No. 410 |
| No. 402 (S) |  | L(−) | No. 411 |

TABLE 8

| Compound No. | Structure | Absolute Configuration |
|---|---|---|
| No. 501 |  | (2S, 4R) |
| No. 502 |  | (2S, 4S) |
| No. 503 |  | (2S, 4S) |
| No. 504 |  | (2S, 4S) |

TABLE 9

| Compound No. | Spontaneous Polarization | Helical Sense in Nematic Phase | 1/P (1%) |
|---|---|---|---|
| No. 101 | − | L(−) | −0.0392 |
| No. 102 | + | L(−) | |
| No. 103 | − | L(−) | |
| No. 501 | − | R(+) | +0.0931 |

TABLE 9-continued

| Compound No. | Spontaneous Polarization | Helical Sense in Nematic Phase | 1/P (1%) |
|---|---|---|---|
| No. 502 | − | R(+) | +0.0447 |
| No. 503 | − | L(−) | −0.0086 |
| No. 504 | − | L(−) | −0.0405 |

TABLE 10

| Compound No. | Structure | C | Sc | S_A | N | I |
|---|---|---|---|---|---|---|
| No. 601 | $C_9H_{19}$—〈〉—COO—〈〉—$OC_6H_{13}$ | . 41 | (. 37) | — | . 64 | . |
| No. 602 | $C_8H_{17}O$—〈〉—COO—〈〉—$OC_4H_9$ | . 58 | . 60 | — | . 89 | . |
| No. 603 | $C_8H_{17}O$—〈〉—COO—〈〉—$OC_6H_{13}$ | . 55 | . 66 | — | . 90 | . |
| No. 604 | $C_8H_{17}O$—〈〉—COO—〈〉—$OC_8H_{17}$ | . 61 | . 73 | — | . 90 | . |
| No. 605 | $C_8H_{17}O$—〈naphthalene〉—COO—〈〉—COO—$C_8H_{17}$ | . 90 | — | . 110 | — | . |
| No. 606 | $C_5H_{11}$—〈cyclohexyl〉—COO—〈naphthalene〉—$OC_8H_{17}$ | . 55 | (. 45) | . 104 | . 116 | . |
| No. 607 | $C_8H_{17}O$—〈〉—COO—〈〉—〈cyclohexyl〉—$C_5H_{11}$ | . 82 | . 100 | — | . 183 | . |
| No. 608 | $C_{10}H_{21}O$—〈〉—COO—〈〉—〈cyclohexyl〉—$C_5H_{11}$ | . 73 | . 120 | . 127 | . 170 | . |
| No. 609 | $C_8H_{17}O$—〈〉—〈〉—COO—〈〉—$OC_8H_{17}$ | . 111 | . 165 | . 199 | . 199 | . |
| No. 610 | $C_8H_{17}O$—〈〉—〈〉—COO—〈〉—$OC_6H_{13}$ | . 108 | . 166 | . 203 | . 206 | . |
| No. 611 | $C_7H_{15}$—〈pyrimidine〉—〈〉—$OC_9H_{19}$ | . 46 | . 51 | . 57 | 70 | . |

TABLE 10-continued

| Compound No. | Structure | C | Sc | S_A | N | I |
|---|---|---|---|---|---|---|
| No. 612 | C8H17-pyrazine-phenyl-OC8H17 | . 29 | . 56 | . 62 | . 68 | . |
| No. 613 | C8H17-pyrazine-phenyl-OC10H21 | . 32 | . 60 | . 66 | . 70 | . |
| No. 614 | C9H19-pyrazine-phenyl-OC6H13 | | 43 | . 70 | . 71 | . |
| No. 615 | C6H13-pyrazine-phenyl-phenyl-C5H11 | . 55 | . 82 | — | . 155 | . |
| No. 616 | C6H13-pyrazine-phenyl-phenyl-C7H15 | . 67 | . 96 | — | . 163 | . |
| No. 617 | C8H17-phenyl-pyrazine-phenyl-OC5H11 | . 78 | . 167 | . 192 | — | . |

TABLE 11

|  | Composition No. 701 | Composition No. 702 | Composition No. 703 | Composition No. 704 |
|---|---|---|---|---|
| No. 101 | 2.7 | 1.9 | 1.5 | 1.3 |
| No. 501 | 1.3 | 2.3 | | |
| No. 502 | | | 1.5 | 1.0 |
| No. 503 | | | 1.9 | |
| No. 504 | | 3.9 | | |
| No. 601 | | 11.2 | 12.5 | 6.5 |
| No. 602 | | 11.1 | 6.2 | 3.3 |
| No. 603 | | 22.2 | 6.2 | 6.5 |
| No. 604 | | 16.5 | 9.2 | 1.6 |
| No. 605 | | 3.3 | 7.4 | 1.0 |
| No. 606 | | | 6.1 | 3.2 |
| No. 607 | | 5.6 | 9.3 | 1.6 |
| No. 608 | | 16.5 | 3.1 | 4.9 |
| No. 609 | | 5.5 | | |
| No. 610 | | | | 1.6 |
| No. 611 | 13.9 | | 5.1 | 9.8 |
| No. 612 | 13.6 | | 5.0 | 9.5 |
| No. 613 | 23.1 | | 8.4 | 16.2 |
| No. 614 | 14.1 | | 5.1 | 9.9 |
| No. 615 | 13.6 | | 5.0 | 9.6 |
| No. 616 | 13.6 | | 5.0 | 9.6 |
| No. 617 | 4.1 | | 1.5 | 2.9 |

TABLE 12

| Composition No. | Transition Temperature | | | | Spontaneous Polarization Value (nC/cm²) | Response Speed (μsec) $V = \pm 5V/\mu m$ | | | Tilt Angle $\theta$ (deg.) | Memory Angle $2\omega$ (deg.) | Memory Pulse Width (μsec) $V = \pm 30V$ | | Cell Thickness (μm) | Contrast | 1/P (μm⁻¹) |
|---|---|---|---|---|---|---|---|---|---|---|---|---|---|---|---|
| | Sc | S_A | N | I | | 0 → 50% | 0 → 90% | 10 → 90% | | | Waveform a | Waveform b | | | |
| No. 701 | .55 | .76 | .89 | . | −0.5 | 222 | 480 | 375 | 22 | 9 | 35 | 12 | 1.5 | ~8 | +0.015 |
| No. 702 | .55 | .76 | .99 | . | −10.2 | 183 | 316 | 217 | 21 | 15 | 15 | 15 | 1.5 | ~6 | −0.018 |
| No. 703 | .36 | .68 | .87 | . | −2.4 | 124 | 191 | 118 | 18 | 9 | 35 | 35 | 1.7 | ~6 | −0.008 |
| No. 704 | .56 | .68 | .90 | . | — | 348 | 770 | 642 | 17 | 11 | 70 | 100 | 1.5 | ~7 | −0.006 |

What is claimed is:

1. A ferroelectric liquid crystal composition comprising:

at least one optically active compound of the formula (I):

where $R^1$ and $R^2$ are, the same or different, a straight or branched chain alkyl group having 1 to 15 carbon atoms, k represents an integer of 0 or 1, and * represents an asymmetric carbon atom;

at least one compound selected from the group consisting of:

a compound of the formula (II):

where $R^3$ and $R^4$ are a straight or branched chain alkyl or alkoxy group having 1-15 carbon atoms and each represent X represents —O—, —CO— or a single bond, m and n are independently an integer of 0 or 1; and a compound of the formula (III):

where $R^5$ and $R^6$ are, the same or different, a straight or branched chain alkyl or alkoxy group having 1-15 carbon atoms, and p is an integer of 0 or 1;

said ferroelectric liquid crystal composition exhibiting at least nematic phase, smectic A phase and smectic C phase.

2. A ferroelectric liquid crystal composition as claimed in claim 1, which includes at least one compound of the formula (II).

3. A ferroelectric liquid crystal composition as claimed in claim 2, wherein said optically active compound of the formula (I) and said compound of the formula (II) are included in respective amounts of 0.1-10 wt. % and 25-99.9 wt. %.

4. A ferroelectric liquid crystal composition as claimed in claim 1, which includes at least one compound of the formula (III).

5. A ferroelectric liquid crystal composition as claimed in claim 4, wherein said optically active compound of the formula (I) and said compound of the formula (III) are included in respective amounts of 0.1-10 wt. % and 30-99.9 wt. %.

6. A ferroelectric liquid crystal composition as claimed in claim 1, which includes at least one compound of the formula (II) and at least one compound of the formula (III).

7. A ferroelectric liquid crystal composition as claimed in claim 6, wherein said optically active compound of the formula (I), said compound of the formula (II) and said compound of the formula (III) are included in respective amounts of 0.1-10 wt. %, 25-70 wt. % and 30-75 wt. %.

8. A ferroelectric liquid crystal composition, as set forth in claim 1, further comprising:

a compound of the formula (IV):

where $R^7$ and $R^8$ are, the same or different, a straight or branched chain alkyl group having 1-15 carbon atoms, is X represents a hydrogen or fluorine atom or a cyano group, Y represents a hydrogen atom or a methyl group, and * represents an asymmetric carbon atom; and/or a compound of the formula (V):

where $R^9$ and $R^{10}$ are, the same or different, a straight or branched chain alkyl or alkoxy group having 1-15 carbon atoms, Y represents a hydrogen atom or a methyl group, is and * represents an asymmetric carbon atom.

9. A ferroelectric liquid crystal composition as set forth in claim 8, which includes at least one compound of the formula (II) and at least one compound of the formula (IV).

10. A ferroelectric liquid crystal composition as set forth in claim 8, wherein said optically active compound of the formula (I), said compound of the formula (II) and said compound of the formula (IV) are included in respective amounts of 0.1–10 wt. %, 25–99.8 wt. % and 0.1–5 wt. %.

11. A ferroelectric liquid crystal composition as set forth in claim 8, which includes at least one compound of the formula (II) and at least one compound of the formula (V).

12. A ferroelectric liquid crystal composition as set forth in claim 8, wherein said optically active compound of the formula (I), said compound of the formula (II) and said compound of the formula (V) are included in respective amounts of 0.1–10 wt. %, 25–99.8 wt. % and 0 1–5 wt. %.

13. A ferroelectric liquid crystal composition as set forth in claim 8, which includes at least one compound of the formula (III) and at least one compound of the formula (IV).

14. A ferroelectric liquid crystal composition as set forth in claim 8, wherein said optically active compound of the formula (I), said compound of the formula (III) and said compound of the formula (IV) are included in respective amounts of 0.1–10 wt. %, 30–99.8 wt. % and 0.1–5 wt. %.

15. A ferroelectric liquid crystal composition as set forth in claim 8, which includes at least one compound of the formula (III) and at least one compound of the formula (V).

16. A ferroelectric liquid crystal composition as set forth in claim 8, wherein said optically active compound of the formula (I), said compound of the formula (III) and said compound of the formula (V) are included in respective amounts of 0.1–10 wt. %, 30–99.8 wt. % and 0.1–5 wt. %.

17. A ferroelectric liquid crystal composition as set forth in claim 8, which includes at least one compound of the formula (II), at least one compound of the formula (III) and at least one compound of the formula (IV).

18. A ferroelectric liquid crystal composition as set forth in claim 8, wherein said optically active compound of the formula (I), said compound of the formula (II), said compound of the formula (III) and said compound of the formula (IV) are included in respect amounts of 0.1–10 wt. %, 25–69.8 wt. %, 30–74.8 wt. % and 0.1–5 wt. %.

19. A ferroelectric liquid crystal composition as set forth in claim 8, which includes at least one compound of the formula (II), at least one compound of the formula (III) and at least one compound of the formula (V).

20. A ferroelectric liquid crystal composition as set forth in claim 8, wherein said optically active compound of the formula (I), said compound of the formula (II), said compound of the formula (III) and said compound of the formula (V) are included in respective amounts of 0.1–10 wt. %, 25–69.8 wt. %, 30–74.8 wt. % and 0.1–5 wt. %.

21. A ferroelectric liquid crystal composition as set forth in claim 1, wherein $R^1$ and $R^2$ are an alkyl group having 3–13 carbon atoms and an alkyl group having 3–10 carbon atoms, respectively.

22. A ferroelectric liquid crystal device comprising a pair of transparent insulator substrates, a transparent electrode and an orientation control layer which are formed in the order on each of said substrates, and a ferroelectric liquid crystal material sandwich by the substrates, said pair of substrates being desposed as opposed to each other so as to make the orientation control layers oppose to each other, said ferroelectric liquid crystal material being a ferroelectric liquid crystal composition of claim 1.

23. A ferroelectric liquid crystal device as set forth in claim 22, wherein said liquid crystal material is a ferroelectric liquid crystal composition as claimed in any one of claims 2–21.

* * * * *